(12) United States Patent
Hertz

(10) Patent No.: US 6,178,709 B1
(45) Date of Patent: Jan. 30, 2001

(54) PLASTIC FOUNDATION SYSTEM

(76) Inventor: Dave Hertz, 411 Stanford St. #51, Vermillion, SD (US) 57069

( * ) Notice: Under 35 U.S.C. 154(b), the term of this patent shall be extended for 0 days.

(21) Appl. No.: 09/258,335

(22) Filed: Feb. 25, 1999

(51) Int. Cl.[7] .................................................. E02D 27/00
(52) U.S. Cl. ..................... 52/292; 52/293.2; 52/293.3; 52/298; 52/295; 52/293.1
(58) Field of Search ....................... 52/292, 293, 1, 52/293.2, 293.3, 298, 295

(56) References Cited

U.S. PATENT DOCUMENTS

| | | |
|---|---|---|
| 2,365,579 | 12/1944 | Mulligan . |
| 3,783,563 | 1/1974 | Moore . |
| 3,921,355 | 11/1975 | Pennecot . |
| 4,455,793 | 6/1984 | Nania . |
| 4,615,155 | 10/1986 | Chamberlain . |
| 4,689,926 | 9/1987 | McDonald . |
| 4,777,774 | 10/1988 | Smalley, III . |
| 4,924,641 | 5/1990 | Gibbar, Jr. . |
| 5,331,782 | 7/1994 | Wohlgemuth . |
| 5,353,563 | 10/1994 | White . |
| 5,416,139 | 5/1995 | Zeiszler . |

FOREIGN PATENT DOCUMENTS

| | | |
|---|---|---|
| 0 058 237 A1 | 8/1982 | (EP) . |
| 88/01327 A1 | 2/1988 | (WO) . |
| 93/11316 A1 | 6/1993 | (WO) . |

*Primary Examiner*—Carl D. Friedman
*Assistant Examiner*—Dennis L. Dorsey

(57) ABSTRACT

A plastic foundation system for quickly providing a structural foundation. The plastic foundation system includes plastic components having heating elements selectively embedded within for fusing abutting portions of adjacent components. The components include wall portions having a flange for insertion into the keyway of a base portion. The base portions can be segmented to provide adjustability to various angles. Heating elements are provided to fuse the segments of the adjustable base portion together. The base portion is also segmented with apertures to permit drainage through the base portion. In an alternate embodiment, connecting rods extend between adjacent wall portions.

14 Claims, 4 Drawing Sheets

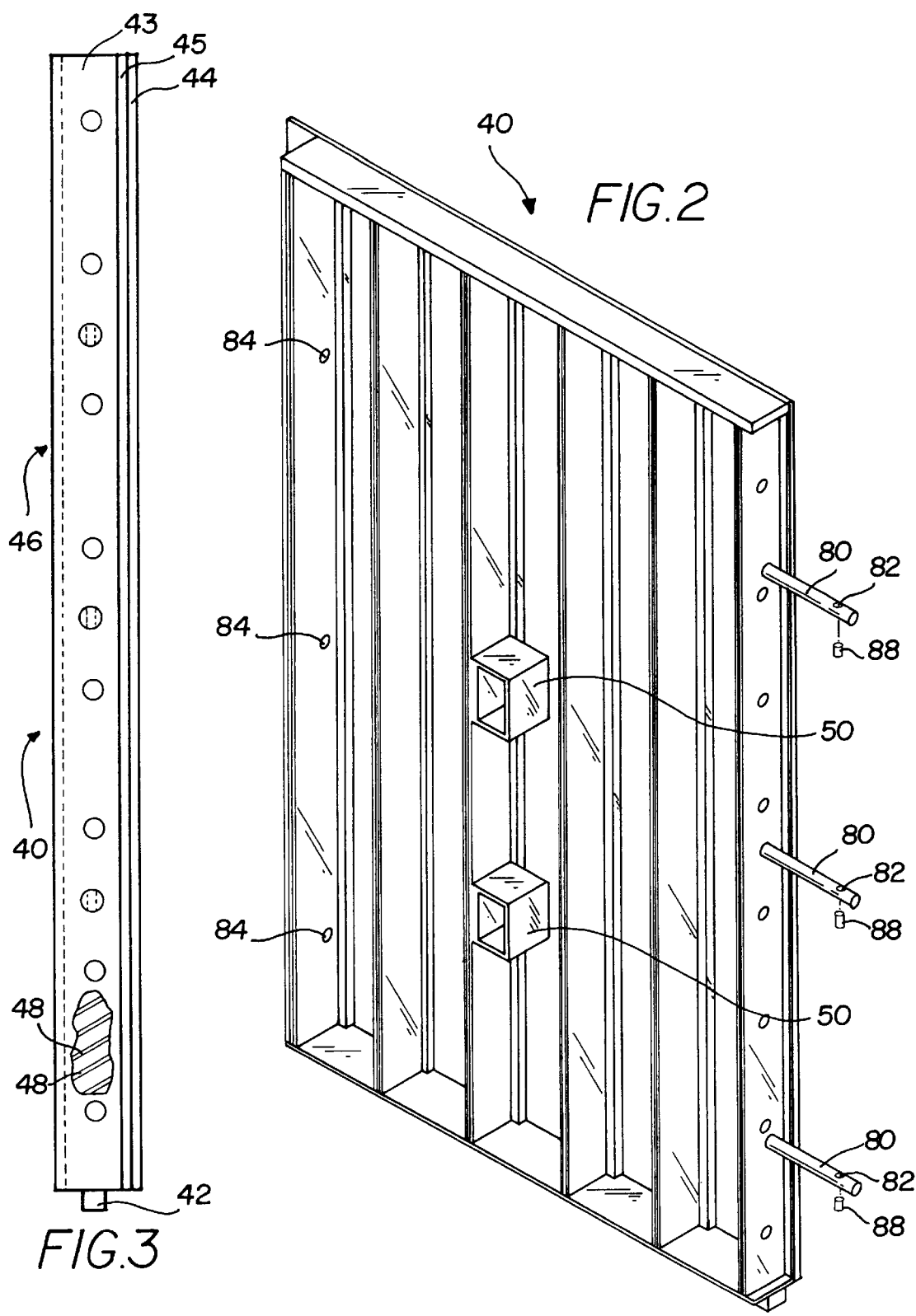

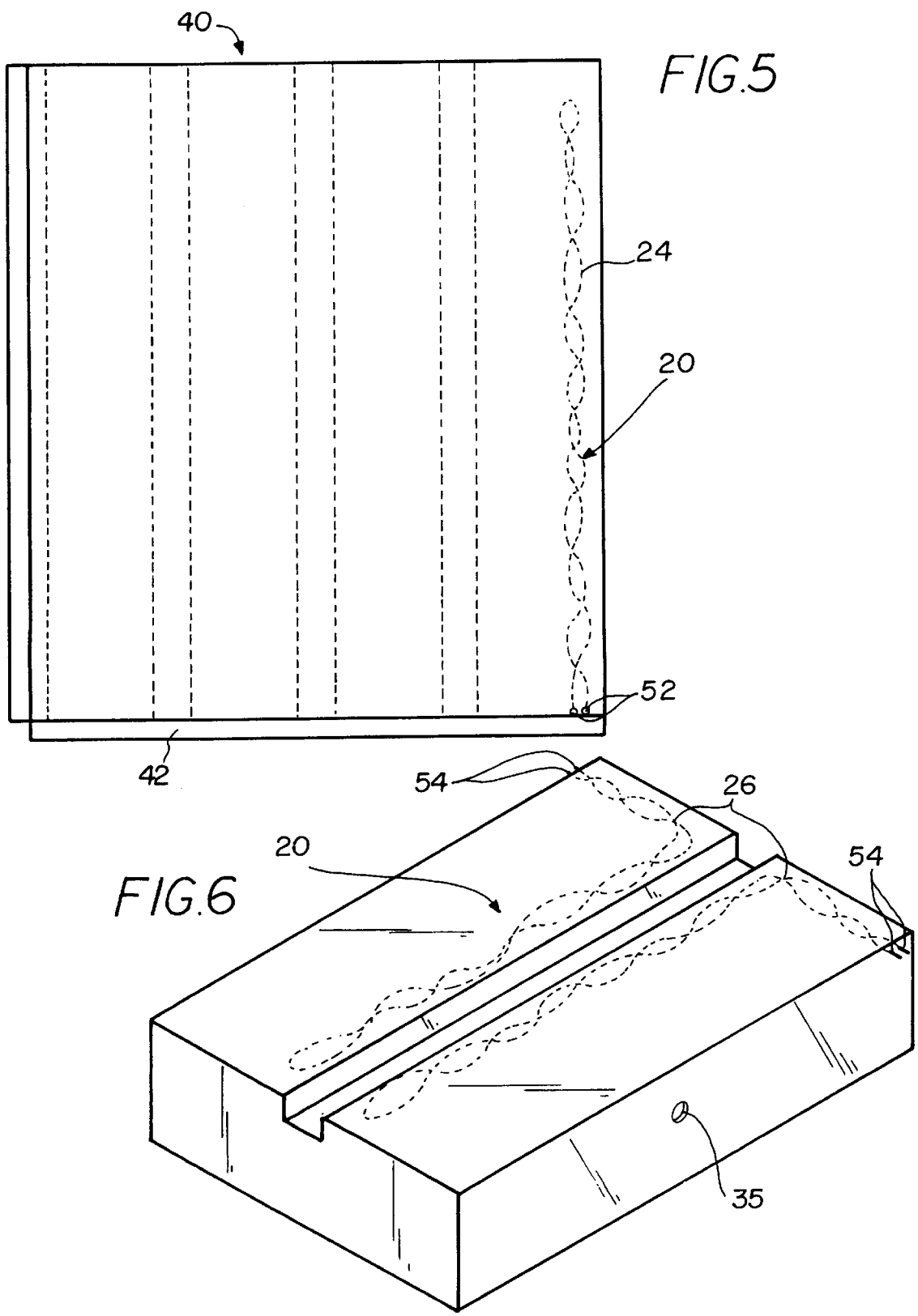

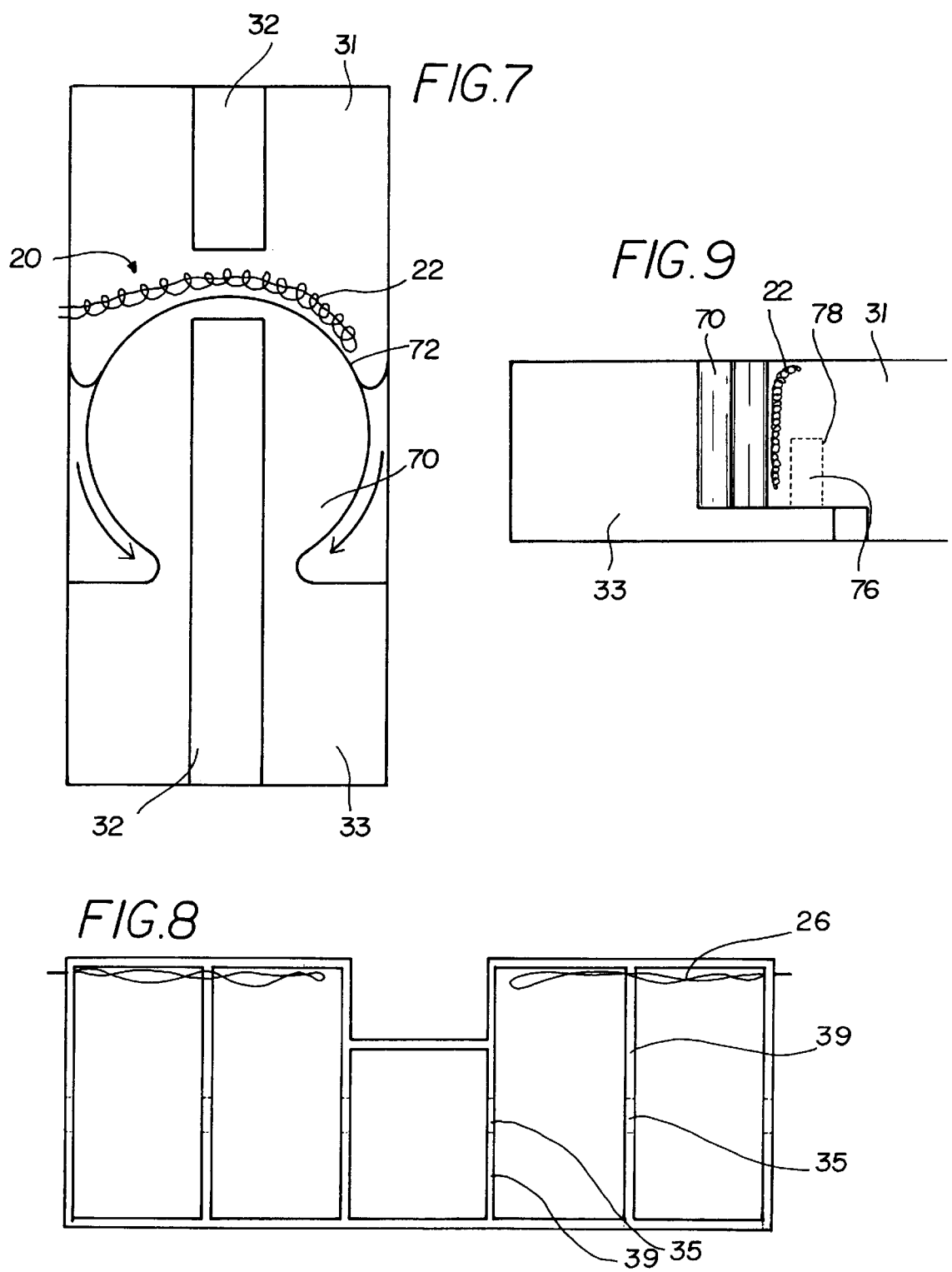

PLASTIC FOUNDATION SYSTEM

BACKGROUND OF THE INVENTION

1. Field of the Invention

The present invention relates to structural foundations and more particularly pertains to a new plastic foundation system for quickly providing a structural foundation.

2. Description of the Prior Art

The use of structural foundations is known in the prior art. More specifically, structural foundations heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,689,926; U.S. Pat. No. 5,416,139; U.S. Pat. No. 3,783,563; U.S. Pat. No. 2,365,579; U.S. Pat. No. Des. 389,201; U.S. Pat. No. 4,615,155; U.S. Pat. No. 4,777,774; U.S. Pat. No. 4,924,641; U.S. Pat. No. 5,331,782; U.S. Pat. No. 4,455,793; PCT Patent No. WO 93/11316; PCT Patent No. 88/01327; and European Patent No. 0 058 287.

While these devices fulfill their respective, particular objectives and requirements, the aforementioned patents do not disclose a new plastic foundation system. The inventive device includes plastic components having heating elements selectively embedded within for fusing abutting portions of adjacent components.

In these respects, the plastic foundation system according to the present invention substantially departs from the conventional concepts and designs of the prior art, and in so doing provides an apparatus primarily developed for the purpose of quickly providing a structural foundation.

SUMMARY OF THE INVENTION

In view of the foregoing disadvantages inherent in the known types of structural foundations now present in the prior art, the present invention provides a new plastic foundation system construction wherein the same can be utilized for quickly providing a structural foundation.

The general purpose of the present invention, which will be described subsequently in greater detail, is to provide a new plastic foundation system apparatus and method which has many of the advantages of the structural foundations mentioned heretofore and many novel features that result in a new plastic foundation system which is not anticipated, rendered obvious, suggested, or even implied by any of the prior art structural foundations, either alone or in any combination thereof.

To attain this, the present invention generally comprises plastic components having heating elements selectively embedded within for fusing abutting portions of adjacent components.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plastic foundation system apparatus and method which has many of the advantages of the structural foundations mentioned heretofore and many novel features that result in a new plastic foundation system which is not anticipated, rendered obvious, suggested, or even implied by any of the prior art structural foundations, either alone or in any combination thereof.

It is another object of the present invention to provide a new plastic foundation system that may be easily and efficiently manufactured and marketed.

It is a further object of the present invention to provide a new plastic foundation system that is of a durable and reliable construction.

An even further object of the present invention is to provide a new plastic foundation system that is susceptible of a low cost of manufacture with regard to both materials and labor, and that accordingly is then susceptible of low prices of sale to the consuming public, thereby making such plastic foundation system economically available to the buying public.

Still yet another object of the present invention is to provide a new plastic foundation system which provides in the apparatuses and methods of the prior art some of the advantages thereof, while simultaneously overcoming some of the disadvantages normally associated therewith.

Still another object of the present invention is to provide a new plastic foundation system for quickly providing a structural foundation.

Yet another object of the present invention is to provide a new plastic foundation system which includes plastic components having heating elements selectively embedded within for fusing abutting portions of adjacent components.

Still yet another object of the present invention is to provide a new plastic foundation system that can be installed and set within a drastically reduced time period compared to current conventional foundations.

Even still another object of the present invention is to provide a new plastic foundation system that provides components fused together to form a watertight seal between adjacent components.

Still yet another object of the present invention is to utilize recyclable material in the construction of foundations.

Even still another object of the invention is to provide a system for constructing a foundation that does not use concrete and is therefore capable of being constructed quickly in situations when concrete is unusable such as in winter.

Still yet another object of the present invention is to provide a system for constructing a foundation that can be utilized in any type of weather.

Yet another object of the present invention is to provide an energy efficient quickly constructable foundation that provides it's own inherent insulation as compared to concrete foundations.

Even still another object of the present invention is to provide a quickly constructable foundation in which drain tile is integrally incorporated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the wall portion of the present invention.

FIG. 3 is a side view of an alternate embodiment of the present invention.

FIG. 5 is a front view of a wall portion of the present invention.

FIG. 6 is a perspective view of a base portion the present invention.

FIG. 7 is a top view of a segmented base portion.

FIG. 8 is a cross sectional view of the base portion taken along line 8—8 of FIG. 7.

FIG. 9 is a side view of a segmented base portion.

DESCRIPTION OF THE PREFERRED EMBODIMENT

Figure 1:
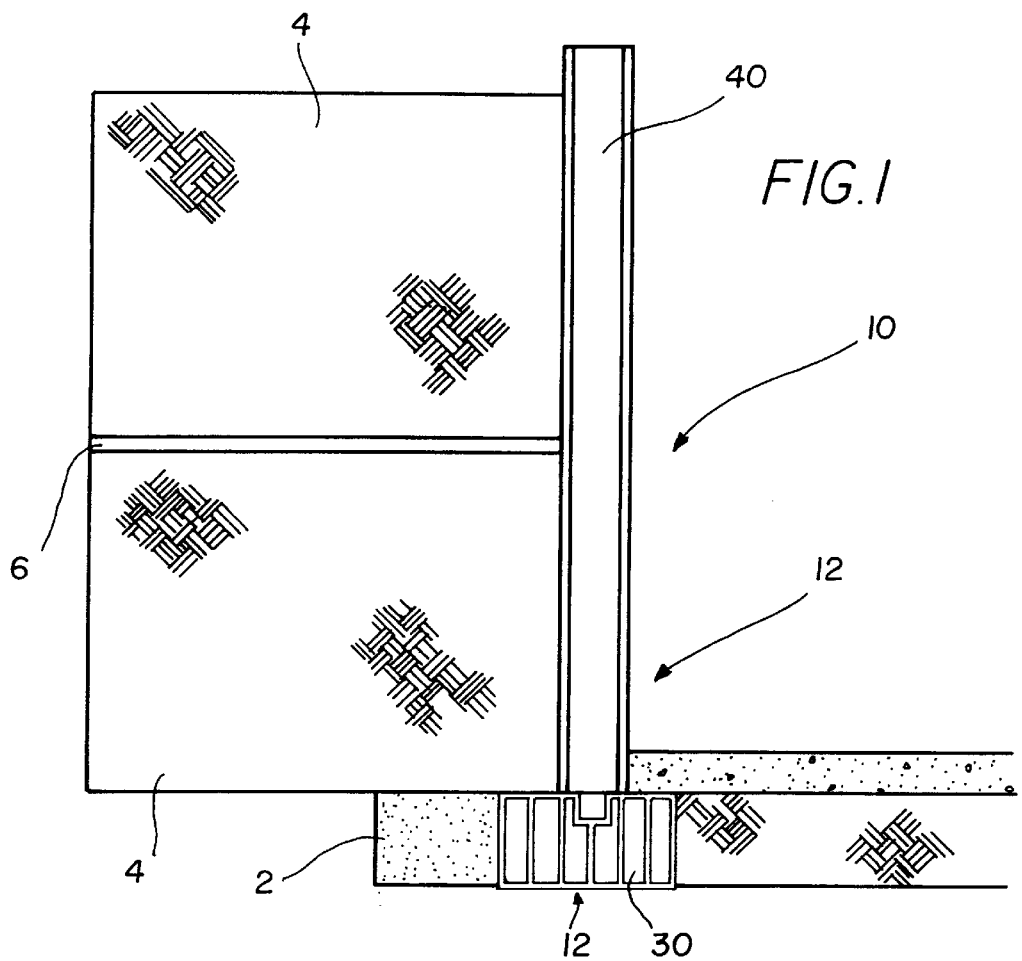
FIG. 1 is a side view of a new plastic foundation system according to the present invention.
Figure 4:
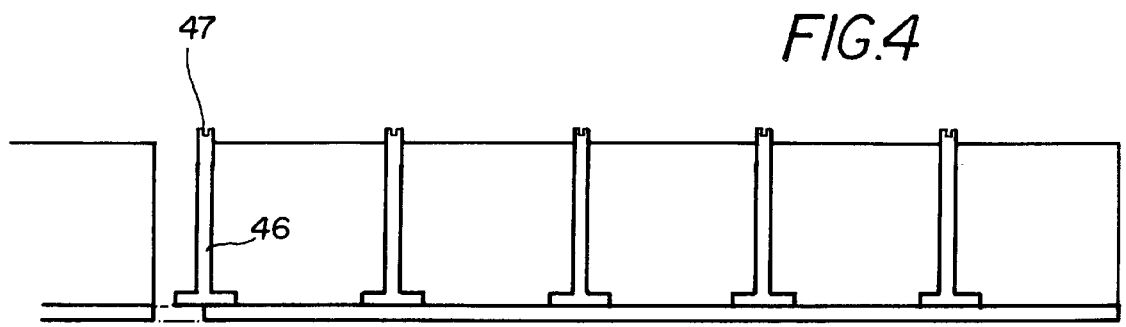
FIG. 4 is a top view of adjacent wall portions.

With reference now to the drawings, and in particular to FIGS. 1 through 8 thereof, a new plastic foundation system embodying the principles and concepts of the present invention and generally designated by the reference numeral 10 will be described.

As best illustrated in FIGS. 1 through 8, the plastic foundation system 10 generally comprises a plurality of foundation components 12 positionable to form a structural foundation.

A plurality of heating elements 20 are embedded within the plurality of foundation components 12. Each of the heating elements 20 is positioned such that a portion of one of the foundation components 12 is fusable to an adjacently positioned portion of another one of the foundation components when an electrical current is passed through the heating element 20. The plurality of foundation components 12 includes a base portion 30 structured to have a keyway 32 therein. The plurality of foundation components also includes a wall portion 40 having a bottom flange 42 structured for insertion into the keyway 32 such that the keyway 32 snugly receives the bottom flange 42.

The wall portion 40 further includes a planar portion 44 and a plurality of vertical support members 46. The vertical support members are positioned in spaced relationship with respect to each other and include a groove 47 extending along a length of a distal edge of the vertical support member facing outwardly from the planar portion 44. Each of the vertical support members 46 preferably has a hollow interior and a plurality of interior support members 48 positioned in a spaced relationship with respect to each other.

The base portion 30 includes a base top 34, a base bottom 36 and base exterior walls 38 to form a hollow interior. The base portion further includes a plurality of base support members 39 extending between the base top 34 and the base bottom 36. The base support members 39 are further positioned in spaced relationship to each other within the hollow interior to form a plurality of interior base compartments 37.

Each of the plurality of base support members 39 includes at least one aperture 35 such that each interior base compartment 37 is in environmental communication with an adjacent interior base compartment.

Each base portion 30 can alternately include a first segment 31 and a second segment 33. The second segment includes a pin 76 insertable into a recess 78 in the first segment 31 such that the segments are hingedly coupled to each other such that the base portion 30 is adjustable to form an angle between the first segment 31 and the second segment 33. The first segment 31 also has inwardly curved interior end 72 and the second segment has a hub 70 abutting the inwardly curved interior end 72 of the first segment 31. An angle heating element 22 is positioned within the first segment 31 proximate an outer surface of the hub 70 of the second segment 33 such that the first segment 31 is fusable to the second segment 33 by passing an electrical current through the angle heating element 22.

For convenience at least one of the vertical support members 46 can include an outlet box 50.

Most preferably, the vertical support members 46 each are generally T-shaped to include a central flange 43 extending outwardly from a transverse member 45.

For coupling wall portions together, the vertical support members including a first outermost support member 46A which is offset from a first edge of the planar portion 44 and a second outermost vertical support member 46B is positioned adjacent a second edge of the planar portion 44 opposite the first edge of the planar portion. The second outermost vertical support member 46B is positioned such that a connection portion of the transverse member 45 extends outwardly from the second edge of the planar portion 44 substantially parallel to the planar portion. A first edge heating element 24 is positioned adjacent the first edge of the planar portion 44 such that the connection portion of an adjacently positioned wall portion is fusable to the planar portion 44 proximate the first edge heating element when an electrical current is passed through the first edge heating element 24.

A pair of electrical leads 52 are positioned on an exterior surface of the wall portion 40 to facilitate introduction of an electrical current to the first edge heating element 24.

Similarly, a base portion heating element 26 is embedded within the base portion 30 proximate the keyway 32 such that the wall portion 44 is fusable to the base portion 30 by passing an electrical current through the base portion heating element 26. A pair of electrical leads 54 positioned on an exterior surface of the base portion 30 to facilitate introduction of an electrical current to the base portion heating element 26.

In an alternate embodiment, connecting rods 80 extend from an outermost vertical support member through holes 84 in an adjacently positioned vertical support member. The connecting rods have an aperture 82 for receiving a locking pin 88 such that the adjacent wall portions are locked together.

In use, the base portion is positioned with pea rock 2 distributed on the exterior side of the foundation. The wall portion is fused to the base portion and a first amount of backfill 4 is placed over the pea rock 2. Preferably, for maximum stability, a sheeting member 6 is couplable to the wall portion and another level of backfill 4 is positioned over the sheeting member 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foundation system comprising:
   a plurality of plastic foundation components being positionable to form a structural foundation; and
   a plurality of heating elements embedded within said plurality of foundation components, each of said heating elements being positioned such that a portion of one of said foundation components is fusable to an adjacently positioned portion of another one of said foundation components when an electrical current is passed through said heating element.

2. The foundation system of claim 1 wherein the plurality of foundation components includes a base portion structured to have a keyway therein.

3. The foundation system of claim 2 wherein the plurality of foundation components includes a wall portion having a bottom flange, said bottom flange being structured for insertion into said keyway such that said keyway snugly receives said bottom flange.

4. The foundation system of claim 3 wherein said wall portion further includes a planar portion and a plurality of vertical support members extending outwardly from said planar portion, said vertical support members being positioned in spaced relationship with respect to each other, each of said vertical support members having a groove extending along a length of a distal edge of the vertical support member facing outwardly from the planar portion, each of said vertical support members having a hollow interior and a plurality of interior support members positioned in a spaced relationship with respect to each other.

5. The foundation system of claim 2 wherein the base portion comprises a base top, a base bottom and base exterior walls to form a hollow interior and a plurality of base support members, said base support members extending between said base top and said base bottom and being positioned in spaced relationship to each other within said hollow interior to form a plurality of interior base compartments.

6. The foundation system of claim 5 wherein each of said plurality of base support members includes at least one aperture such that each interior base compartments is in environmental communication with an adjacent interior base compartment.

7. The foundation system of claim 2 wherein the base portion includes a first segment and a second segment, the first segment being formed to have a recess and said second segment including a pin insertable into said recess of the first segment such that the segments are hingedly coupled to each other such that the base portion is adjustable to form an angle between the first segment and the second segment;
   wherein the first segment further includes an inwardly curved interior end;
   wherein the second segment has a hub positioned to abut the inwardly curved interior end of the first segment when said pin is positioned in said recess;
   an angle heating element being positioned within the first segment proximate an outer surface of the hub of the second segment such that the first segment is fusable to the second segment by passing an electrical current through the angle heating element.

8. The foundation system of claim 4, further comprising an outlet box extending from one of said vertical support members.

9. The foundation system of claim 4 further comprising:
   said vertical support members each being generally T-shaped, each of said vertical support members having a central flange extending outwardly from a transverse member, said transverse member being coupled to said planar portion.

10. The foundation system of claim 9 further comprising:
    said vertical support members including a first outermost support member being offset from a first edge of said planar portion and a second outermost vertical support member being positioned adjacent a second edge of the planar portion opposite the first edge of said planar portion, said second outermost vertical support member being positioned such that a connection portion of said transverse member extends outwardly from said second edge of said planar portion substantially parallel to said planar portion.

11. The foundation system of claim 10 further comprising a first edge heating element being positioned adjacent said first edge of said planar portion, said first edge heating element further being positioned such that the connection portion of an adjacently positioned wall portion is fusable to the planar portion proximate the first edge heating element when an electrical current is passed through said first edge heating element; and
    a pair of electrical leads positioned on an exterior surface of the wall portion to facilitate introduction of an electrical current to the first edge heating element.

12. The foundation system of claim 3 further comprising:
a base portion beating element embedded within the base portion proximate the keyway such that the wall portion is fusable to the base portion by passing an electrical current through the base portion heating element; and
a pair of electrical leads positioned on an exterior surface of the base portion to facilitate introduction of an electrical current to the base portion heating element.

13. The foundation system of claim 10 further comprising the second outermost vertical support having a plurality of connection rods extending outwardly therefrom;
the first outermost vertical support having a plurality of holes positioned to receive the connecting rods extending from the second outermost vertical support of an adjacently positioned wall portion;
each of said rods including an aperture therethrough extending perpendicularly to a longitudinal axis of the respective rod, each aperture being positioned proximate an interior side of said first outermost vertical support when said connecting rod is inserted through the hole in said first outermost vertical support whereby the wall portion is couplable to the adjacently positioned wall portion by inserting a locking member through said aperture.

14. A foundation system comprising:
a plurality of plastic foundation components being positionable to form a structural foundation;
a plurality of heating elements embedded within said plurality of foundation components, each of said heating elements being positioned such that a portion of one of said foundation components is fusable to an adjacently positioned portion of another one of said foundation components when an electrical current is passed through said heating element;
wherein the plurality of foundation components includes a base portion structured to have a keyway therein;
wherein the plurality of foundation components includes a wall portion having a bottom flange, said bottom flange being structured for insertion into said keyway such that said keyway snugly receives said bottom flange;
wherein said wall portion further includes a planar portion and a plurality of vertical support members extending outwardly from said planar portion, said vertical support members being positioned in spaced relationship with respect to each other, each of said vertical support members having a groove extending along a length of a distal edge of the vertical support member facing outwardly from the planar portion, each of said vertical support members having a hollow interior and a plurality of interior support members positioned in a spaced relationship with respect to each other;
wherein the base portion comprises a base top, a base bottom and base exterior walls to form a hollow interior and a plurality of base support members, said base support members extending between said base top and said base bottom and being positioned in spaced relationship to each other within said hollow interior to form a plurality of interior base compartments;
wherein each of said plurality of base support members includes at least one aperture such that each interior base compartments is in environmental communication with an adjacent interior base compartment;
wherein the base portion includes a first segment and a second segment hingedly coupled to each other such that said base portion is adjustable to form an angle between said first segment and said second segment; and
an angle heating element being positioned within one of the first segment and the second segment adjacent an outer surface of the other of the first segment and the second segment such that the first segment is fusable to the second segment by passing an electrical current through the angle heating element;
an outlet box extending from one of said vertical Support members;
said vertical support members each being generally T-shaped, each of said vertical support members having a central flange extending outwardly from a transverse member, said transverse member being coupled to said planar portion;
said vertical support members including a first outermost support member being offset from a first edge of said planar portion and a second outermost vertical support member being positioned adjacent a second edge of the planar portion opposite the first edge of said planar portion, said second outermost vertical support member being positioned such that a connection portion of said transverse member extends outwardly from said second edge of said planar portion substantially parallel to said planar portion;
a first edge heating element being positioned adjacent said first edge of said planar portion, said first edge heating element further being positioned such that the connection portion of an adjacently positioned wall portion is fusable to the planar portion proximate the first edge heating element when an electrical current is passed through said first edge heating element; and
a pair of electrical leads positioned on an exterior surface of the wall portion to facilitate introduction of an electrical current to the first edge heating element;
a base portion heating element embedded within the base portion proximate the keyway such that the wall portion is fusable to the base portion by passing an electrical current through the base portion heating element; and
a pair of electrical leads positioned on an exterior surface of the base portion to facilitate introduction of an electrical current to the base portion heating element.

* * * * *